(12) United States Patent  
Nakatani

(10) Patent No.: US 8,256,907 B2  
(45) Date of Patent: Sep. 4, 2012

(54) VEHICLE REFLECTOR AND REFLEX PIN

(75) Inventor: Akihiro Nakatani, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 7 days.

(21) Appl. No.: 13/085,006

(22) Filed: Apr. 12, 2011

(65) Prior Publication Data

US 2011/0255164 A1  Oct. 20, 2011

(30) Foreign Application Priority Data

Apr. 15, 2010  (JP) ................... 2010-094197

(51) Int. Cl.
*G02B 5/124* (2006.01)
(52) U.S. Cl. ..................... 359/530; 359/529
(58) Field of Classification Search ........... 359/529–533
See application file for complete search history.

(56) References Cited

U.S. PATENT DOCUMENTS 5,844,712 A    12/1998  Caroli
2011/0044066 A1 *  2/2011  Ishii .......................... 362/516

FOREIGN PATENT DOCUMENTS

JP           3340640 B2    11/2002

* cited by examiner

*Primary Examiner* — James Phan
(74) *Attorney, Agent, or Firm* — Kenealy Vaidya LLP

(57) ABSTRACT

A vehicle reflector can include a plurality of retroreflection elements including a first reflection surface, a second reflection surface, and a third reflection surface which are adjacently disposed to form a corner portion of a substantially regular hexahedron. The first reflection surface can be inclined by 35.264°+angle α1 with respect to a reference axis. The second reflection surface can be inclined by 35.264°+angle α2 with respect to the reference axis and can be disposed at a position rotated by 120° about the reference axis from the first reflection surface. The third reflection surface can be inclined by 35.264°+angle α3 with respect to the reference axis and can be disposed at a position rotated by 120° in an opposite direction from the second reflection surface about the reference axis from the first reflection surface. The angle α1, angle α2 and angle α3 can be set to satisfy a relation of −α1=α2=α3 or −α1≈α2=α3.

7 Claims, 19 Drawing Sheets

FIG.8A

*RELATION OF DIFFUSION ANGLE AND SURFACE ANGLES (α1, 2, 3) OF LENS REFLECTOR

SURFACE ANGLE (BASE = 35.264 deg), ANGLE PITCH 0.012 deg, 0.012 deg

| α1 | α2, α3 | LENS CENTER RAY | LENS LATERAL RAY | AVERAGE | ERROR 1 (UD DIRECTION) | ERROR 2 (RL DIRECTION) | DIFFERENCE 1 (UD) CENTER RAY | DIFFERENCE 2 (UD) LATERAL RAY | EF CENTER RAY | EF LATERAL RAY | AVERAGE | ERROR 1 (UD DIRECTION) | ERROR 2 (RL DIRECTION) | DIFFERENCE 1 (UD) CENTER RAY | DIFFERENCE 2 (UD) LATERAL RAY | REMARKS |
|---|---|---|---|---|---|---|---|---|---|---|---|---|---|---|---|---|
| -0.012 | 0.012 | 0.039 | 0.04 | 0.040 | 0.001 | 0.002 | | | 0.026 | 0.027 | 0.027 | 0.001 | 0.002 | | | |
| -0.024 | 0.024 | 0.08 | 0.081 | 0.081 | 0.001 | 0.002 | 0.041 | 0.041 | 0.054 | 0.055 | 0.055 | 0.001 | 0.002 | 0.028 | 0.028 | |
| -0.036 | 0.036 | 0.121 | 0.123 | 0.122 | 0.002 | 0.002 | 0.041 | 0.042 | 0.081 | 0.082 | 0.082 | 0.001 | 0.002 | 0.027 | 0.027 | |
| -0.048 | 0.048 | 0.163 | 0.164 | 0.164 | 0.001 | 0.002 | 0.042 | 0.041 | 0.109 | 0.11 | 0.110 | 0.001 | 0.002 | 0.028 | 0.028 | |
| -0.06 | 0.06 | 0.204 | 0.206 | 0.205 | 0.002 | 0.002 | 0.041 | 0.042 | 0.137 | 0.138 | 0.138 | 0.001 | 0.002 | 0.028 | 0.028 | ↓ AIMING AT OBSERVATION ANGLE OF 0.2 deg |
| -0.072 | 0.072 | 0.246 | 0.247 | 0.247 | 0.001 | 0.002 | 0.042 | 0.041 | 0.165 | 0.166 | 0.166 | 0.001 | 0.002 | 0.028 | 0.028 | |
| -0.084 | 0.084 | 0.287 | 0.289 | 0.288 | 0.002 | 0.002 | 0.041 | 0.042 | 0.192 | 0.193 | 0.193 | 0.001 | 0.002 | 0.027 | 0.027 | |
| -0.096 | 0.096 | 0.328 | 0.33 | 0.329 | 0.002 | 0.002 | 0.041 | 0.041 | 0.22 | 0.221 | 0.221 | 0.001 | 0.002 | 0.028 | 0.028 | ↓ AIMING AT OBSERVATION ANGLE OF 0.33 deg |
| -0.108 | 0.108 | 0.37 | 0.372 | 0.371 | 0.002 | 0.002 | 0.042 | 0.042 | 0.248 | 0.249 | 0.249 | 0.001 | 0.002 | 0.028 | 0.028 | |

FIG.8B

*RELATION OF DIFFUSION ANGLE AND SURFACE ANGLES (α1, 2, 3) OF LENS REFLECTOR

SURFACE ANGLE (BASE = 35.264 deg)    ANGLE PITCH 0.012 deg    0.012 deg

| α1 | α2, α3 | LENS CENTER RAY | LENS LATERAL RAY | AVERAGE | ERROR 1 (UD DIRECTION) | ERROR 2 (RL DIRECTION) | DIFFERENCE 1 (UD) CENTER RAY | DIFFERENCE 2 (UD) LATERAL RAY | EF CENTER RAY | EF LATERAL RAY | AVERAGE | ERROR 1 (UD DIRECTION) | ERROR 2 (RL DIRECTION) | DIFFERENCE 1 (UD) CENTER RAY | DIFFERENCE 2 (UD) LATERAL RAY | REMARKS |
|---|---|---|---|---|---|---|---|---|---|---|---|---|---|---|---|---|
| -0.12 | 0.12 | 0.411 | 0.413 | 0.412 | 0.002 | 0.002 | 0.041 | 0.041 | 0.276 | 0.277 | 0.277 | 0.001 | 0.001 | 0.028 | 0.028 | |
| -0.132 | 0.132 | 0.453 | 0.455 | 0.454 | 0.002 | 0.002 | 0.042 | 0.042 | 0.304 | 0.305 | 0.305 | 0.001 | 0.001 | 0.028 | 0.028 | |
| -0.144 | 0.144 | 0.494 | 0.496 | 0.495 | 0.002 | 0.002 | 0.041 | 0.041 | 0.331 | 0.333 | 0.332 | 0.002 | 0.001 | 0.027 | 0.028 | |
| -0.156 | 0.156 | 0.536 | 0.538 | 0.537 | 0.002 | 0.002 | 0.042 | 0.042 | 0.359 | 0.36 | 0.360 | 0.001 | 0.001 | 0.028 | 0.028 | |
| -0.168 | 0.168 | 0.577 | 0.579 | 0.578 | 0.002 | 0.002 | 0.041 | 0.041 | 0.387 | 0.388 | 0.388 | 0.001 | 0.001 | 0.028 | 0.028 | |
| -0.18 | 0.18 | 0.619 | 0.621 | 0.620 | 0.003 | 0.002 | 0.042 | 0.042 | 0.415 | 0.416 | 0.416 | 0.001 | 0.001 | 0.028 | 0.028 | |
| -0.192 | 0.192 | 0.66 | 0.663 | 0.662 | 0.002 | 0.002 | 0.041 | 0.042 | 0.443 | 0.444 | 0.444 | 0.001 | 0.001 | 0.028 | 0.028 | |
| -0.204 | 0.204 | 0.702 | 0.704 | 0.703 | 0.002 | 0.002 | 0.042 | 0.041 | 0.47 | 0.472 | 0.471 | 0.002 | 0.001 | 0.027 | 0.028 | |
| -0.216 | 0.216 | 0.744 | 0.746 | 0.745 | 0.002 | 0.002 | 0.041 | 0.042 | 0.498 | 0.5 | 0.499 | 0.002 | 0.001 | 0.028 | 0.028 | |

FIG.8C

*RELATION OF DIFFUSION ANGLE AND SURFACE ANGLES (α1, 2, 3) OF LENS REFLECTOR

SURFACE ANGLE (BASE = 35.264 deg)    ANGLE PITCH 0.012 deg    0.012 deg

| α1 | α2, α3 | LENS CENTER RAY | LENS LATERAL RAY | AVERAGE | ERROR 1 (UD DIRECTION) | ERROR 2 (RL DIRECTION) | DIFFERENCE 1 CENTER RAY (UD) | DIFFERENCE 2 LATERAL RAY (UD) | EF CENTER RAY | EF LATERAL RAY | AVERAGE | ERROR 1 (UD DIRECTION) | ERROR 2 (RL DIRECTION) | DIFFERENCE 1 CENTER RAY (UD) | DIFFERENCE 2 LATERAL RAY (UD) | REMARKS |
|---|---|---|---|---|---|---|---|---|---|---|---|---|---|---|---|---|
| -0.228 | 0.228 | 0.785 | 0.788 | 0.787 | 0.003 | 0.002 | 0.041 | 0.042 | 0.526 | 0.528 | 0.527 | 0.002 | 0.001 | 0.028 | 0.028 | |
| -0.24 | 0.24 | 0.827 | 0.829 | 0.828 | 0.002 | 0.002 | 0.042 | 0.041 | 0.554 | 0.556 | 0.555 | 0.002 | 0.001 | 0.028 | 0.028 | |
| -0.252 | 0.252 | 0.868 | 0.871 | 0.870 | 0.003 | 0.002 | 0.041 | 0.042 | 0.582 | 0.584 | 0.583 | 0.002 | 0.001 | 0.028 | 0.028 | |
| -0.264 | 0.264 | 0.91 | 0.913 | 0.912 | 0.003 | 0.001 | 0.042 | 0.042 | 0.61 | 0.612 | 0.611 | 0.002 | 0.001 | 0.028 | 0.028 | |
| -0.276 | 0.276 | 0.952 | 0.955 | 0.954 | 0.003 | 0.001 | 0.042 | 0.042 | 0.638 | 0.64 | 0.639 | 0.002 | 0.001 | 0.028 | 0.028 | |
| -0.288 | 0.288 | 0.993 | 0.996 | 0.995 | 0.003 | 0.001 | 0.041 | 0.041 | 0.666 | 0.668 | 0.667 | 0.002 | 0.001 | 0.028 | 0.028 | |
| -0.3 | 0.3 | 1.035 | 1.038 | 1.037 | 0.003 | 0.001 | 0.042 | 0.042 | 0.694 | 0.696 | 0.695 | 0.002 | 0.001 | 0.028 | 0.028 | |
| -0.312 | 0.312 | 1.076 | 1.08 | 1.078 | 0.004 | 0.001 | 0.041 | 0.042 | 0.721 | 0.724 | 0.723 | 0.003 | 0.001 | 0.027 | 0.028 | |
| -0.324 | 0.324 | 1.118 | 1.122 | 1.120 | 0.004 | 0.001 | 0.042 | 0.042 | 0.749 | 0.752 | 0.751 | 0.003 | 0.001 | 0.028 | 0.028 | |

FIG. 8D

*RELATION OF DIFFUSION ANGLE AND SURFACE ANGLES (α1, 2, 3) OF LENS REFLECTOR

SURFACE ANGLE (BASE = 35.264 deg)　　ANGLE PITCH 0.012 deg　　　0.012 deg

| α1 | α2, α3 | LENS CENTER RAY | LENS LATERAL RAY | AVERAGE | ERROR 1 (UD DIRECTION) | ERROR 2 (RL DIRECTION) | DIFFERENCE 1 (UD) CENTER RAY | DIFFERENCE 2 (UD) LATERAL RAY | EF CENTER RAY | EF LATERAL RAY | AVERAGE | ERROR 1 (UD DIRECTION) | ERROR 2 (RL DIRECTION) | DIFFERENCE 1 (UD) CENTER RAY | DIFFERENCE 2 (UD) LATERAL RAY | REMARKS |
|---|---|---|---|---|---|---|---|---|---|---|---|---|---|---|---|---|
| -0.336 | 0.336 | 1.16 | 1.164 | 1.162 | 0.004 | 0.001 | 0.042 | 0.042 | 0.777 | 0.78 | 0.779 | 0.003 | 0.001 | 0.028 | 0.028 | |
| -0.348 | 0.348 | 1.202 | 1.205 | 1.204 | 0.003 | 0.001 | 0.042 | 0.041 | 0.805 | 0.808 | 0.807 | 0.003 | 0.001 | 0.028 | 0.028 | |
| -0.36 | 0.36 | 1.243 | 1.247 | 1.245 | 0.004 | 0.001 | 0.041 | 0.042 | 0.833 | 0.836 | 0.835 | 0.003 | 0 | 0.028 | 0.028 | |
| -0.372 | 0.372 | 1.285 | 1.289 | 1.287 | 0.004 | 0.001 | 0.042 | 0.042 | 0.861 | 0.864 | 0.863 | 0.003 | 0 | 0.028 | 0.028 | |
| -0.384 | 0.384 | 1.327 | 1.331 | 1.329 | 0.004 | 0 | 0.042 | 0.042 | 0.889 | 0.892 | 0.891 | 0.003 | 0 | 0.028 | 0.028 | |
| -0.396 | 0.396 | 1.368 | 1.373 | 1.371 | 0.005 | 0 | 0.041 | 0.042 | 0.917 | 0.92 | 0.919 | 0.003 | 0 | 0.028 | 0.028 | |
| -0.408 | 0.408 | 1.41 | 1.415 | 1.413 | 0.005 | 0 | 0.042 | 0.042 | 0.945 | 0.948 | 0.947 | 0.003 | 0 | 0.028 | 0.028 | |
| -0.42 | 0.42 | 1.452 | 1.457 | 1.455 | 0.005 | 0 | 0.042 | 0.042 | 0.973 | 0.977 | 0.975 | 0.003 | 0 | 0.028 | 0.028 | |
| -0.432 | 0.432 | 1.494 | 1.499 | 1.497 | 0.005 | 0 | 0.042 | 0.042 | 1.001 | 1.005 | 1.003 | 0.004 | 0 | 0.028 | 0.029 | ← AIMING AT OBSERVATION ANGLE OF 1.5 deg |
| -0.444 | 0.444 | 1.536 | 1.541 | 1.539 | 0.005 | 0 | 0.042 | 0.042 | 1.029 | 1.033 | 1.031 | 0.004 | 0 | 0.028 | 0.028 | |

FIG.10

*DIFFERENCE ACCORDING TO SURFACE ANGLE SETTING METHOD OF REFLECTOR
(IN THE CASE OF PERFORMING SETTING SO THAT OBSERVATION ANGLE OF 0.2 deg IS MAXIMUM)

| TEST POINT | MEASURED CANDLE POWER | | | | | | EXAMPLE/ COMPARATIVE EXAMPLE 1 | EXAMPLE/ COMPARATIVE EXAMPLE 2 |
|---|---|---|---|---|---|---|---|---|
| | EXAMPLE | | COMPARATIVE EXAMPLE 1 | | COMPARATIVE EXAMPLE 2 | | | |
| OBSERVATION 0.20 Deg. | | | | | | | | |
| 10U-V | 11.967 | 78.8% | 11.635 | 79.3% | 5.245 | 76.1% | 102.86% | 228.16% |
| H-20L | 6.109 | 40.2% | 4.815 | 32.8% | 2.120 | 30.7% | 126.89% | 288.15% |
| H-V | 15.186 | | 14.669 | | 6.895 | | 103.52% | 220.24% |
| H-20R | 6.140 | 40.4% | 4.837 | 33.0% | 2.173 | 31.5% | 126.94% | 282.53% |
| 10D-V | 12.114 | 79.8% | 11.755 | 80.1% | 5.339 | 77.4% | 103.05% | 226.88% |
| OBSERVATION 1.50 Deg. | | | | | | | | |
| 10U-V | 0.477 | 74.3% | 0.464 | 79.2% | 0.530 | 80.5% | 102.64% | 89.90% |
| H-20L | 0.239 | 37.2% | 0.181 | 30.9% | 0.209 | 31.8% | 131.78% | 113.95% |
| H-V | 0.642 | | 0.587 | | 0.658 | | 109.44% | 97.49% |
| H-20R | 0.236 | 36.8% | 0.181 | 30.8% | 0.210 | 31.9% | 130.89% | 112.69% |
| 10D-V | 0.479 | 74.6% | 0.466 | 79.4% | 0.533 | 81.0% | 102.76% | 89.76% |

FIG.11

*DIFFERENCE ACCORDING TO SURFACE ANGLE SETTING METHOD OF REFLECTOR
(IN THE CASE OF PERFORMING SETTING SO THAT OBSERVATION ANGLE OF 0.33 deg IS MAXIMUM)

| TEST POINT | MEASURED CANDLE POWER | | | EXAMPLE/ COMPARATIVE EXAMPLE 1 | EXAMPLE/ COMPARATIVE EXAMPLE 2 |
|---|---|---|---|---|---|
| | EXAMPLE | COMPARATIVE EXAMPLE 1 | COMPARATIVE EXAMPLE 2 | | |
| OBSERVATION 0.33 Deg. | | | | | |
| 10U-V | 1043.09  79.7% | 1050.890  79.7% | 408.228  73.4% | 99.26% | 255.52% |
| 5U-20L | 439.37   33.6% | 422.882   32.1% | 190.104  34.2% | 103.90% | 231.12% |
| 5U-20R | 438.44   33.5% | 422.633   32.0% | 196.201  35.3% | 103.74% | 223.46% |
| H-V | 1308.32       % | 1318.930        | 556.279        | 99.20% | 235.19% |
| 5D-20L | 455.36   34.8% | 437.542   33.2% | 213.249  38.3% | 104.07% | 213.54% |
| 5D-20R | 458.48   35.0% | 441.431   33.5% | 213.493  38.4% | 103.86% | 214.75% |
| 10D-V | 1058.79  80.9% | 1067.780  81.0% | 415.822  74.8% | 99.16% | 254.63% |
| OBSERVATION 1.50 Deg. | | | | | |
| 10U-V | 32.15    71.5% | 31.820    71.4% | 43.095   74.9% | 101.03% | 74.60% |
| 5U-20L | 16.00    35.6% | 15.715    35.2% | 20.311   35.3% | 101.82% | 78.78% |
| 5U-20R | 15.92    35.4% | 15.666    35.1% | 20.042   34.8% | 101.61% | 79.42% |
| H-V | 44.94           | 44.585          | 57.566         | 100.79% | 78.06% |
| 5D-20L | 16.34    36.4% | 16.010    35.9% | 20.865   36.2% | 102.08% | 78.33% |
| 5D-20R | 16.46    36.6% | 16.150    36.2% | 20.774   36.1% | 101.89% | 79.21% |
| 10D-V | 32.60    72.5% | 32.302    72.5% | 43.295   75.2% | 100.92% | 75.29% |

RELATED ART

RELATED ART

VEHICLE REFLECTOR AND REFLEX PIN

This application claims the priority benefit under 35 U.S.C. §119 of Japanese Patent Application No. 2010-094197 filed on Apr. 15, 2010, which is hereby incorporated in its entirety by reference.

BACKGROUND

1. Field

The presently disclosed subject matter relates to a vehicle reflector and a reflex pin, and particularly relates to a vehicle reflector capable of obtaining a luminous intensity in an observation angle direction which is equivalent to or higher than certain conventional reflectors by setting an inclination angle of each of the first reflection surface to the third reflection surface, and by using a reflex pin in formation of the vehicle reflector.

2. Description of the Related Art

In the field of vehicle reflectors, an increase in the luminous intensity in the observation angle direction has been demanded. And, as one example of a reflector that may respond to such demand, a vehicle reflector is described in, for example, Japanese Patent No. 3340640.

Vehicle reflector 210 described in Japanese Patent No. 3340640 includes a plurality of retroreflection elements 211 for retroreflecting an incident ray Ray0 which is incident parallel with a reference axis AX in an observation angle $\theta$ direction as illustrated in FIG. 13 of the present application.

Each of the plurality of retroreflection elements 211 includes a first reflection surface 1, a second reflection surface 2 and a third reflection surface 3 which are adjacently disposed to form a corner portion of a substantially regular hexahedron (see FIGS. 14 and 15). Each of the reflection surfaces 1 to 3 is inclined by the same inclination angle with respect to the reference axis AX (see FIG. 14), and the second reflection surface 2 and the third reflection surface 3 are disposed at the positions which are rotated by the same rotation angles ($120°+\beta=120°6'$, $120°+\gamma=120°6'$) with the reference axis AX as the center (see FIG. 15).

In the vehicle reflector 210 of the above described configuration, the ray Ray0 which is irradiated from a light source 230 and parallel with the reference axis AX is incident on a plurality of retroreflection elements 211 (the first to the third reflection surfaces 1 to 3), and is reflected in the direction of the observation angle $\theta$ by the action of the plurality of retroreflection elements 211 (the first to the third reflection surfaces 1 to 3). The reflection lights Ray1 to Ray3 which are reflected in the direction of the observation angle $\theta$ respectively gather at a point P1 at the uppermost portion and points P2 and P3 at both sides under the point P1 (see FIG. 13B, and FIG. 16), and therefore, the luminous intensity in the observation angle $\theta$ direction can be enhanced.

SUMMARY

In the vehicle reflector 210 described in Japanese Patent No. 3340640, the luminous intensity in the observation angle $\theta$ direction is enhanced. However, not only are the respective inclination angles of the first reflection surface to the third reflection surface adjusted with respect to the reference angle AX, but also the respective rotational angles $\beta$ and $\gamma$ of the second reflection surface and the third reflection surface are typically adjusted to achieve a good end result in this product. Therefore, there arises a problem in that the number of items to be adjusted increases, and manufacturing error therefore can increase, which can influence quality of finished products.

The presently disclosed subject matter is made in view of such circumferences, and can include a vehicle reflector which is capable of realizing a luminous intensity in an observation angle direction which is equivalent to or higher than the conventional reflector by only setting respective inclination angles of a first reflection surface to a third reflection surface and without adjusting respective rotational angles $\beta$ and $\gamma$ of the second reflection surface and the third reflection surface. The disclosed subject matter also relates to a reflex pin for use in formation of the vehicle reflector.

In accordance with a first aspect of the presently disclosed subject matter provides a vehicle reflector can include: a plurality of retroreflection elements configured to retroreflect an incident ray in an observation angle direction, wherein the plurality of retroreflection elements include a first reflection surface, a second reflection surface and a third reflection surface which are adjacently disposed to form a corner portion of a substantially regular hexahedron, the first reflection surface is inclined by $35.264°+$angle $\alpha 1$ with respect to a reference axis, the second reflection surface is inclined by $35.264°+$angle $\alpha 2$ with respect to the reference axis and is disposed at a position rotated by 120° about the reference axis as a center from the first reflection surface, the third reflection surface is inclined by $35.264°+$angle $\alpha 3$ with respect to the reference axis and is disposed at a position rotated by 120° in an opposite direction from the second reflection surface about the reference axis as a center from the first reflection surface, and the angle $\alpha 1$, angle $\alpha 2$ and angle $\alpha 3$ are set to satisfy a relation of $-\alpha 1=\alpha 2=\alpha 3$ or $-\alpha 1 \approx \alpha 2=\alpha 3$.

In the above described aspect of the presently disclosed subject matter, the rotational angles of the second reflection surface and the third reflection surface with the reference axis as the center are set at 120°. Therefore, by only setting practically three parameters ($\alpha 1$, $\alpha 2$, $\alpha 3$) so as to satisfy the relation of $-\alpha 1=\alpha 2=\alpha 3$ (or $-\alpha 1 \approx \alpha 2=\alpha 3$) without adjustment of the respective rotational angles $\beta$ and $\gamma$ of the second reflection surface and the third reflection surface, which has been conventionally required, the luminous intensity in the observation angle direction can be equivalent to or higher than the above-described conventional reflector. More specifically, according to the first aspect of the presently disclosed subject matter, adjustment of the respective rotational angles $\beta$ and $\gamma$ of the second reflection surface and the third reflection surface is not required, although the adjustment of the angles $\beta$ and $\gamma$ has been conventionally required. Therefore, the number of items for adjustment decreases, and manufacturing errors can be reduced, so that quality of the finished products can be increased.

According to a second aspect of the presently disclosed subject matter, a reflex pin can include: a tip end portion which is used for formation of each of a plurality of retroreflection elements, the tip end portion configured to retroreflect an incident ray in an observation angle direction, wherein the tip end portion includes a first inclined surface, a second inclined surface and a third inclined surface adjacently disposed to form a corner portion of a substantially regular hexahedron, the first inclined surface is inclined by a $35.264°+$angle $\alpha 4$ with respect to a center axis of the reflex pin, the second inclined surface is inclined by a $35.264°+$angle $\alpha 5$ with respect to the center axis of the reflex pin and is disposed at a position rotated by 120° about the center axis of the reflex pin as a center from the first inclined surface, the third inclined surface is inclined by a $35.264°+$angle $\alpha 6$ with respect to the center axis of the reflex pin and is disposed at a position rotated by 120° in an opposite direction from the second inclined surface about the center axis of the reflex pin as a center from the first inclined surface, and the angle α4, angle α5 and angle α6 are set to satisfy a relation of −α4=α5=α6 or −α4≈α5=α6.

According to the second aspect of the presently disclosed subject matter, the respective rotational angles of the second inclined surface and the third inclined surface with the center axis of the reflex pin as the center are set at 120°. Therefore, the reflex pin can be formed, which is used for formation of the vehicle reflector which can realize the luminous intensity in the observation angle direction which is equivalent to or higher than the conventional reflector by only setting practically three parameters (α4, α5, α6) so as to satisfy the relation of −α4=α5=α6 (or −α4≈α5=α6) without adjustment of the respective rotational angles β and γ of the second inclined surface and the third inclined surface, although the adjustment of the angles β and γ has been conventionally required. More specifically, according to the second aspect of the presently disclosed subject matter, adjustment of the respective rotational angles β and γ of the second inclined surface and the third inclined surface is not required, although the adjustment of the angles β and γ has been conventionally required. Therefore, the number of items for adjustment decreases, and manufacturing errors can be restrained, so that quality of the finished products can be increased.

According to the presently disclosed subject matter, a vehicle reflector can be configured to realize a luminous intensity in the observation angle direction which is equivalent to or higher than the conventional reflector by setting the respective inclination angles of the first reflection surface to the third reflection surface without adjustment of the respective rotational angles β and γ of the second reflection surface and the third reflection surface. A reflex pin is also disclosed which is used for formation of a vehicle reflector as described above. In addition, methods for making the reflector, including a method utilizing the reflex pin, are disclosed.

BRIEF DESCRIPTION OF THE DRAWINGS

FIGS. 8A-8D are tables illustrating a relationship of angles α1 to α3, an angle $\theta_1$ between a lens center ray Ray1 and the reference axis AX1, and an angle $\theta_{23}$ between lens lateral rays Ray2 and Ray 3 and the reference axis AX1;

FIG. 10 is a table illustrating luminous intensities at respective measurement points 10U-V, H-20L, H-V, H-20R and 10D-V of the vehicle reflector of FIG. 1 and comparative examples 1 to 3, relative intensities at the measurement points 10U-V, H20L, H-20R and 10D-V with respect to the measurement point H-V, and the vehicle reflector of FIG. 1/comparative examples 1 to 3;

FIG. 11 is a table illustrating luminous intensities at measurement points 10U-V, 5U-20L, 5U-20R, H-V, 5D-20L, 5D-20R and 10D-V of the vehicle reflector of FIG. 1 and comparative examples 1 to 3, relative intensities at the measurement points 10U-V, 5U-20L, 5U-20R, 5D-20L, 5D-20R and 10D-V with respect to the measurement point H-V, and the vehicle reflector of FIG. 1/comparative examples 1 to 3;

DETAILED DESCRIPTION OF EXEMPLARY EMBODIMENTS

Hereinafter, an example of a vehicle reflector which is one embodiment of the presently disclosed subject matter will be described with reference to the drawings.

Figure 1:
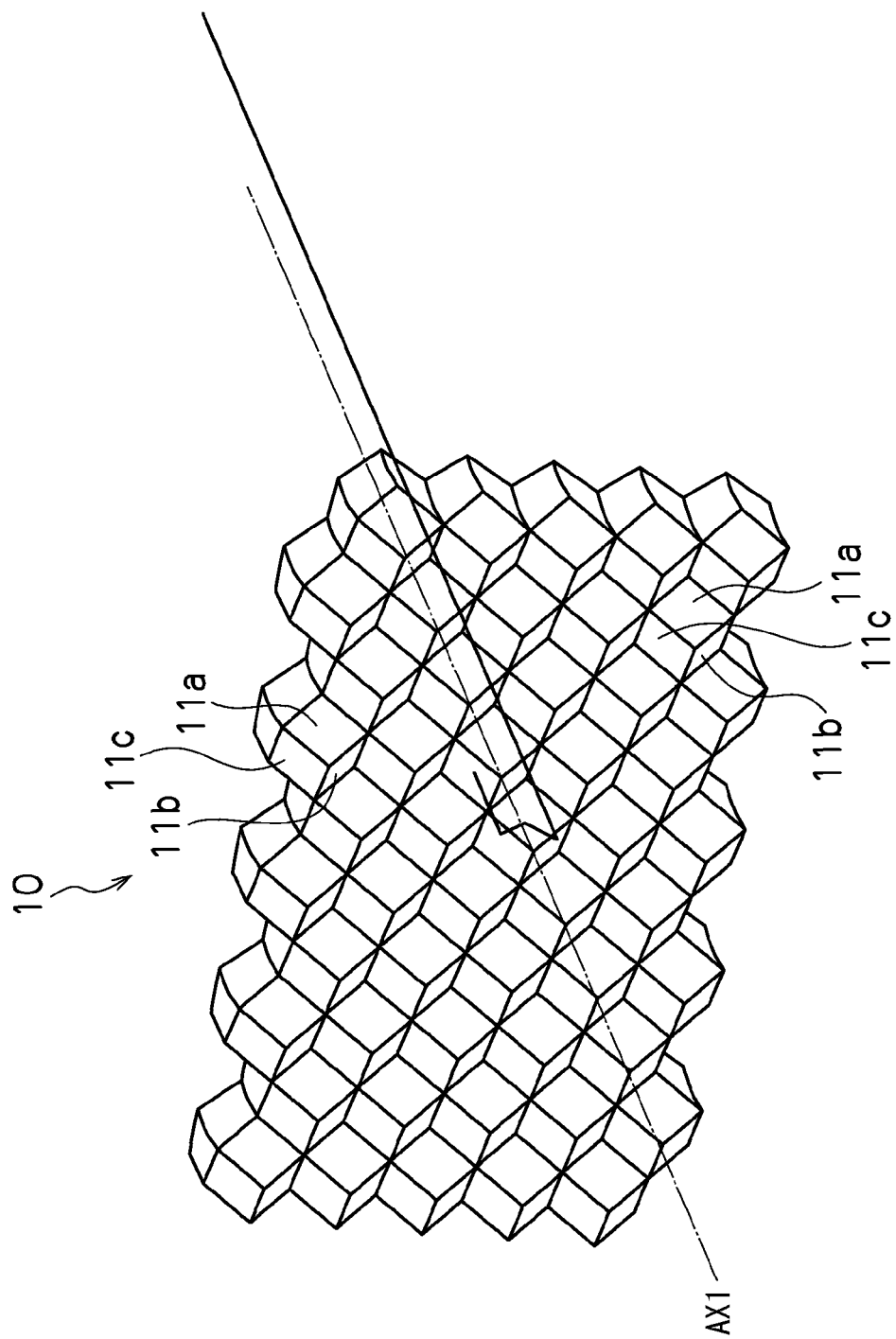
FIG. 1 is a perspective view (rear side) of a vehicle reflector according to an embodiment of the presently disclosed subject matter.
Figure 2:
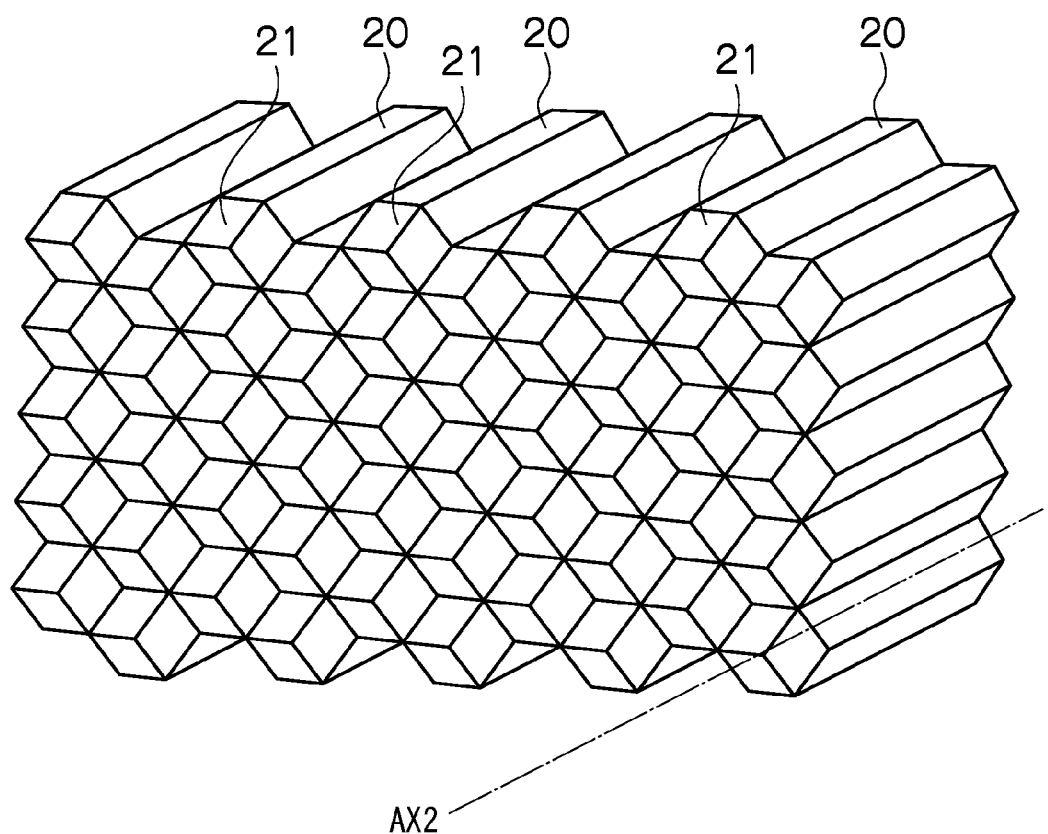
FIG. 2 is a perspective view of a reflex pin for use in formation of the vehicle reflector illustrated in FIG. 1.

A vehicle reflector 10 of the present embodiment is a so-called reflex reflector which is fitted to a vehicle, such as an automobile, a two-wheeler, a truck, an SUV, etc. As illustrated in FIG. 1, the vehicle reflector 10 can include a front surface on which irradiated light from other vehicles, exterior lights, and the like located around the vehicle to which the vehicle reflector 10 is attached is incident, a back surface on an opposite side of the front surface, and a plurality of retroreflection elements 11 which are defined by a plurality of reflex pins 20 (tip end portions 21) as illustrated in FIG. 2 on the back surface. The vehicle reflector 10 can be formed by a light transmissive material such as acryl and polycarbonate such as in an ordinary reflex reflector.

The retroreflection element 11 can include a lateral direction surface 11a (corresponding to a first reflection surface), a downward direction surface 11b (corresponding to a second reflection surface) which is disposed at a lower side in the vertical direction, and an upward direction surface 11c (corresponding to a third reflection surface) which is disposed at an upper side in the vertical direction. The respective surfaces 11a to 11c can be adjacently disposed with respect to each other in order to form a corner portion (also called a corner cube portion) of a substantially regular hexahedron (see FIG. 1).

Figure 4:
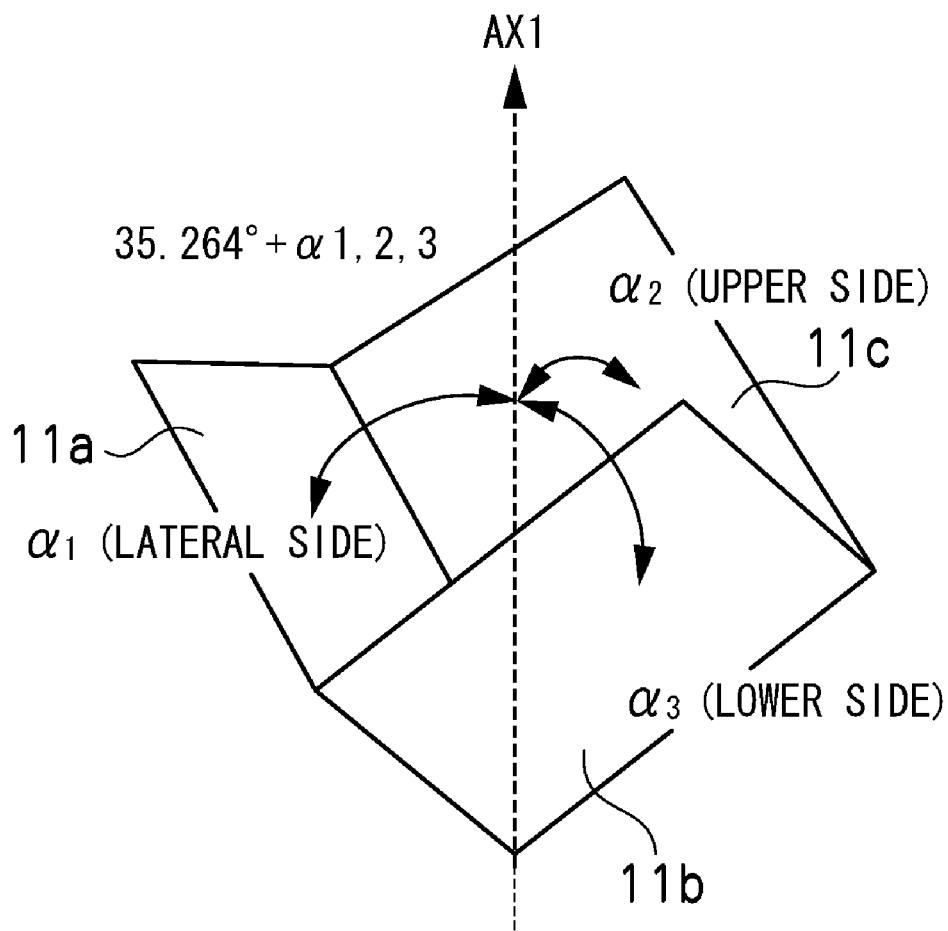
FIG. 4 is a view for explaining inclination angles of reflection surfaces with respect to a reference axis AX1 of the reflector of FIG. 1.
Figure 5:
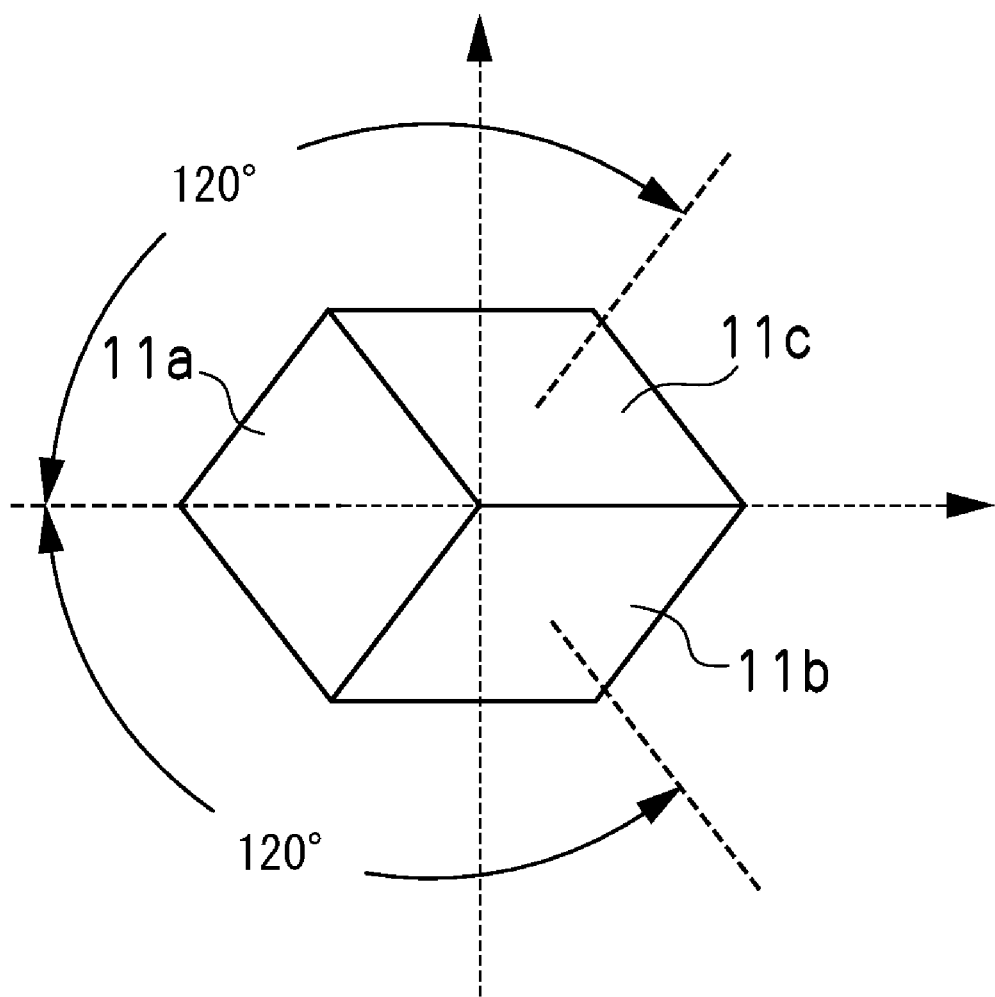
FIG. 5 is a view for explaining rotational angles of second and third reflection surfaces with respect to a first reflection surface of the reflector of FIG. 1.

As illustrated in FIG. 4, the lateral direction surface 11a can be inclined by a first inclination angle of 35.264°+angle α1 with respect to the reference axis AX1 (also called a rotational axis). The downward direction surface 11b can be disposed at a position which is inclined by a second inclination angle of 35.264°+angle α2 with respect to the reference axis AX1 (see FIG. 4), and can be rotated by a downward direction rotational angle of 120° with the reference axis AX1 as the center from the lateral direction surface 11a (see FIG. 5). The upward direction surface 11c can be disposed at a position which is inclined by a third inclination angle of 35.264°+angle α3 with respect to the reference axis AX1 (see FIG. 4) and can be rotated by an upward direction rotational angle of 120° in an opposite direction from the downward direction surface 11b with the reference axis AX1 as the center from the lateral direction surface 11a (see FIG. 5).

Figure 3:
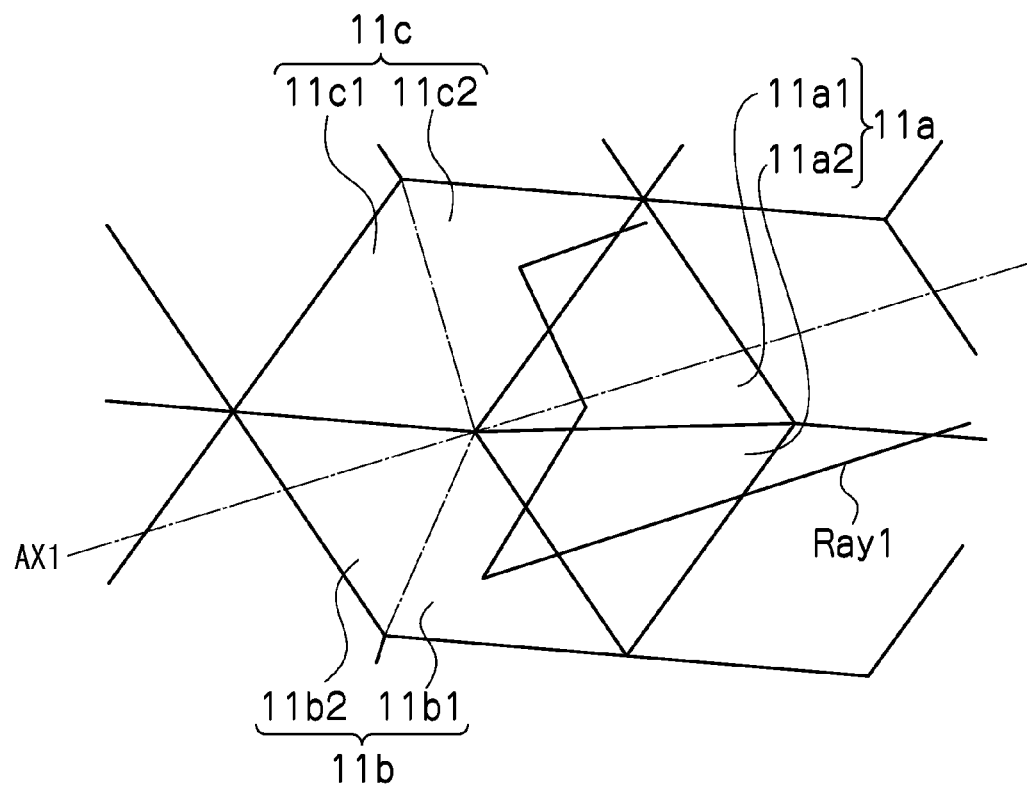
FIG. 3 is a partially enlarged view of the vehicle reflector and retroreflection element illustrated in FIG. 1.
Figure 6:
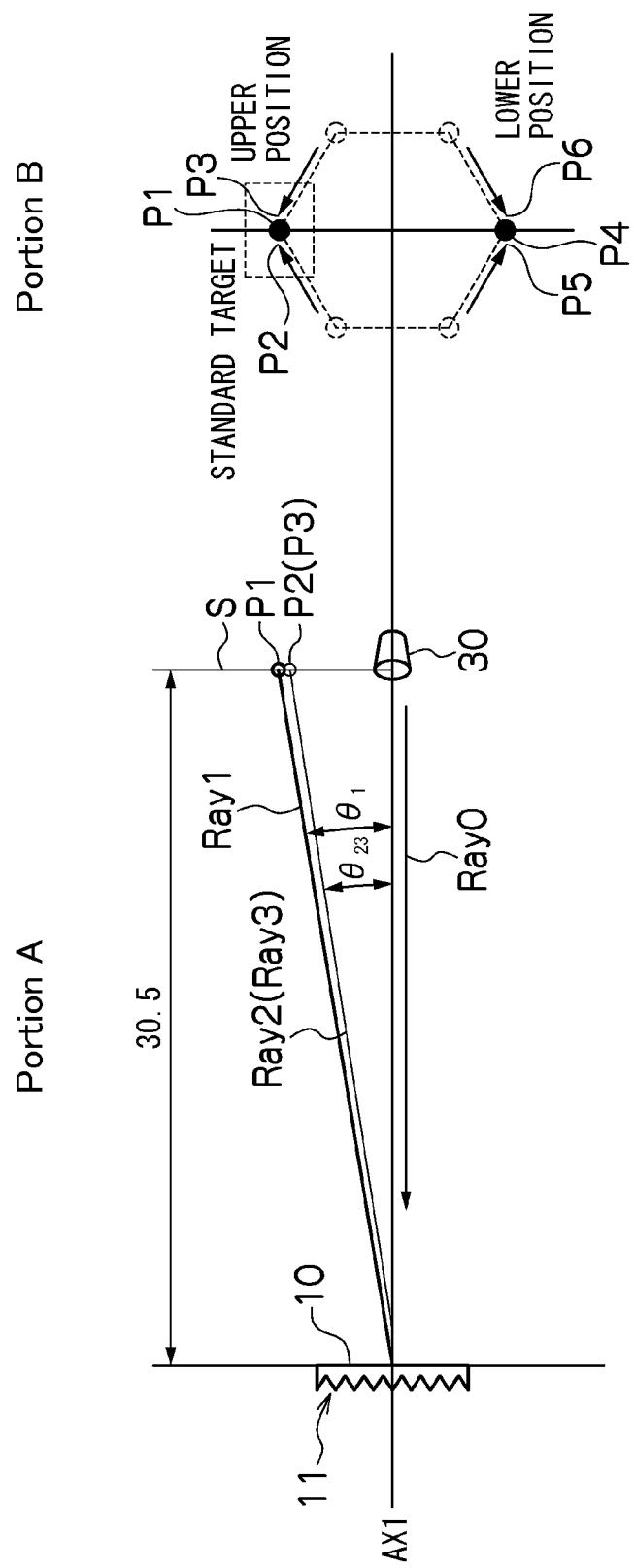
FIG. 6 is a diagram illustrating collection points at which reflection light reflected by the vehicle reflector of FIG. 1 collect (Portion A of FIG. 6 is a diagram illustrating arrangement of the vehicle reflector, a light source and a vertical screen S, and Portion B of FIG. 6 is a diagram illustrating points P1 to P3 at which reflection lights R1 to R3 collect respectively)

As illustrated in Portion A of FIG. 6, a light ray Ray0 which is irradiated from a light source 30 and which is parallel with the reference axis AX1 is incident on the retroreflection element 11 (respective surfaces 11a to 11c), and is reflected in the directions corresponding to regions 11a1 to 11c2 (see FIG. 3) of the respective surfaces 11a to 11c, that is, six directions in total, which are three directions (observation angle direction) which are diagonally upward with respect to the reference axis AX1, and three directions which are diagonally downward with respect to the reference axis AX1.

Figure 7:
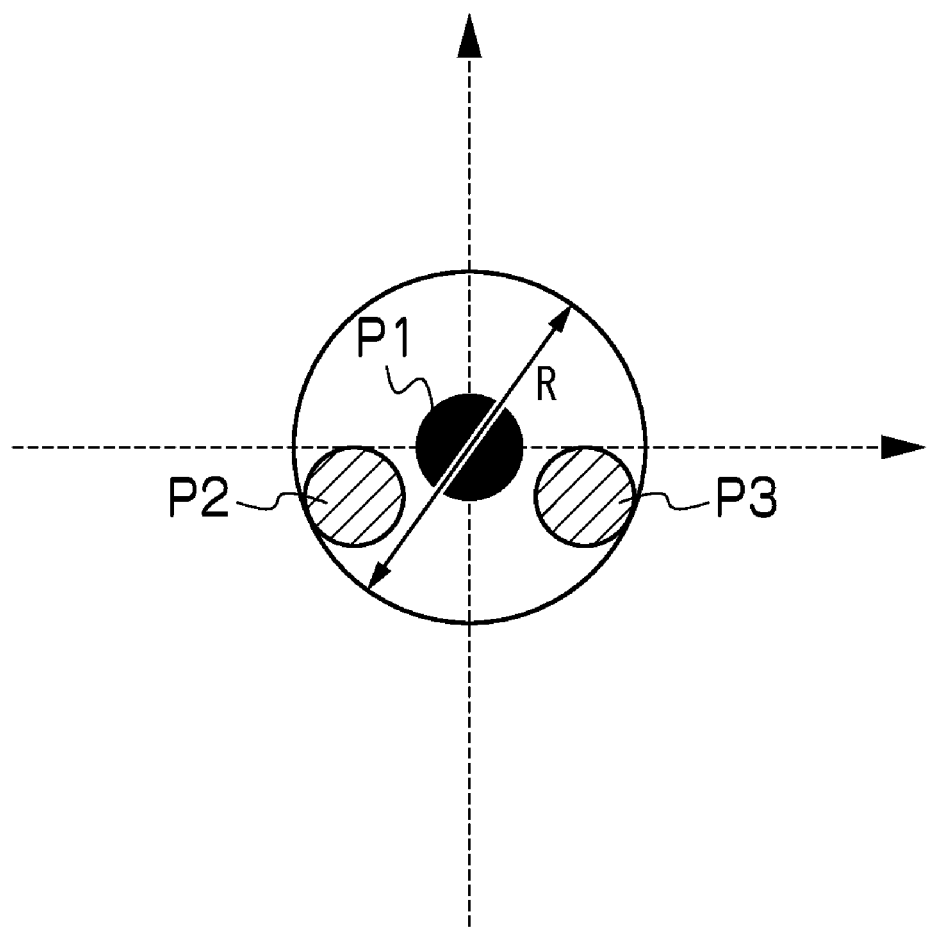
FIG. 7 is a diagram illustrating the points P1 to P3 at which the reflection light rays R1 to R3 collect.

Reflection light rays Ray1 to Ray3 which are reflected in the observation angle direction collect at a point P1 at an uppermost portion and points P2 and P3 at both sides under the point P1 (see Portion B of FIG. 6 and FIG. 7). Meanwhile, the reflection light rays which are reflected in the three directions which are diagonally downward with respect to the reference axis AX1 collect at a point P4 at a lowermost portion and points P5 and P6 at both sides above point P4 respectively (see Portion B of FIG. 6).

The inventor of the presently disclosed subject matter has found out the following fact as a result of measuring an angle $\theta_1$ formed by the lens center ray Ray1 and the reference axis AX1, and angles $\theta_{23}$ formed by lens lateral rays Ray2 and Ray3 and the reference axis AX1 for each of angles α1 to α3, as illustrated in FIG. 8.

First, when the angles α1 to α3 satisfy the relation of $-α1=α2=α3$, the reflection light rays Ray1 to Ray3 which are reflected in the observation angle direction collect at the point P1 at the uppermost portion and the points P2 and P3 in a circle of a radius R with the point P1 as a center (0.01° or less when the radius R is converted into an angle, ±0.001° or less when α1 and α2 and α3 are finely adjusted) on a vertical screen S (see Portion A of FIG. 6) which is disposed forward of the light source 30 (positioned away from the light source 30 by, for example, 30.5 m) (see FIG. 6 and FIG. 7). More specifically, if the angles α1 to α3 satisfy the relation of $-α1=α2=α3$, the reflection light rays Ray1 to Ray3 can be superimposed on the vertical center axis in an arbitrary diffusion angle, and the intensity of the ray can be trebled at the superimposed position (see Portion B of FIG. 6 and FIG. 7).

Secondly, when the relation of $-α1=α2=α3$ is satisfied, the points P1 to P3 are not superimposed completely (deviated by 0.005° at the maximum in the observation angle of 0 to 1.5°), but by fine adjustment of the angles α1 to α3 (in the range up to ±0.002°) to satisfy the relation of $-α1≈α2=α3$, and thereby the points P1 to P3 can be substantially completely superimposed on one another.

Figure 9:
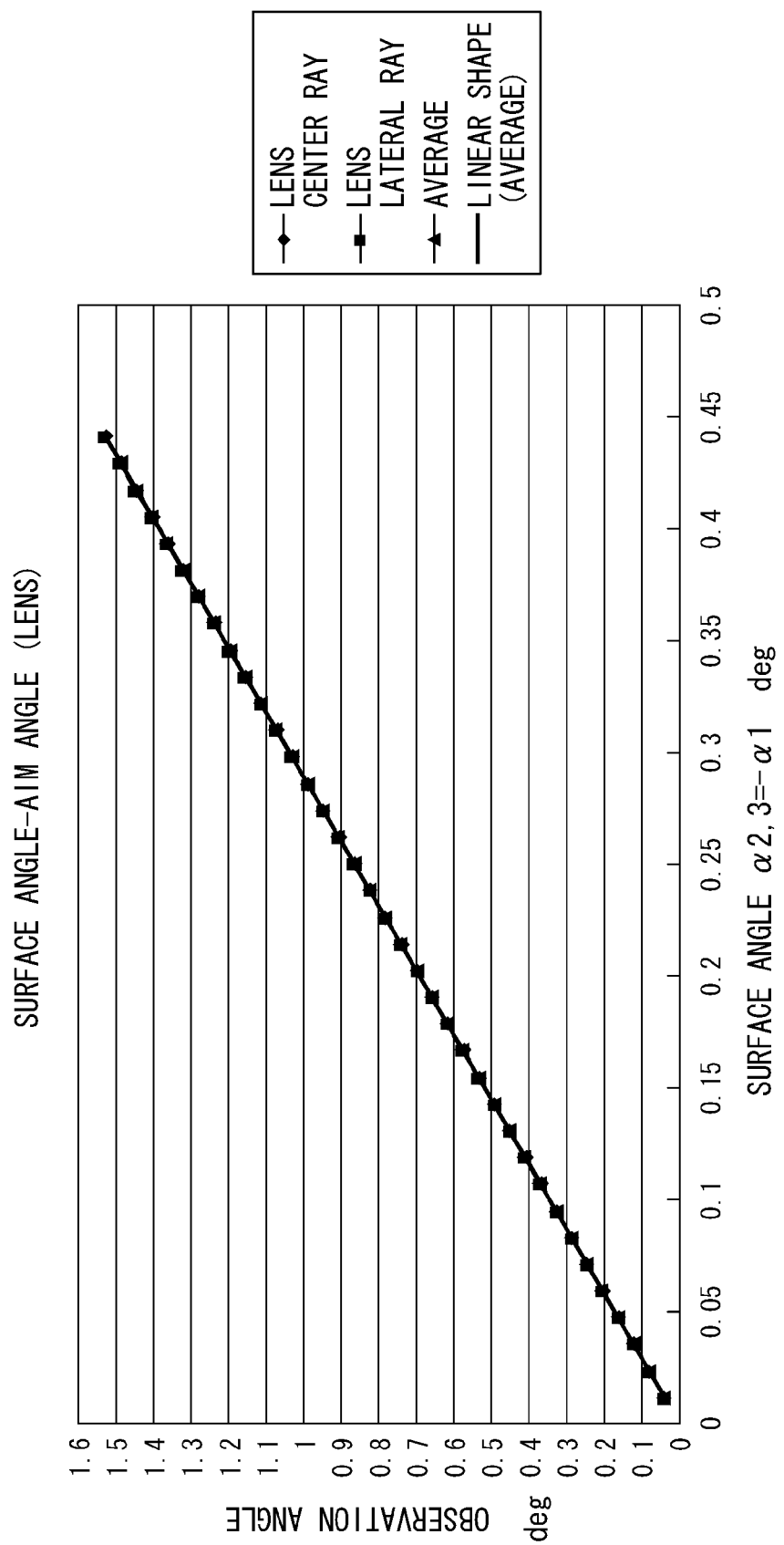
FIG. 9 is a graph in which the measurement result of FIG. 8 is plotted in a coordinate system with an axis of ordinates representing an angle with respect to the reference axis AX and an axis of abscissa representing −α1(=α2=α3)

Thirdly, when the angles α1 to α3 satisfy the relation of $-α1=α2=α3$, a proportional relation exists between the angles α1 to α3 and an average θ (average of $\theta_1$ and $\theta_{23}$)(see FIGS. 8 and 9). Accordingly, with use of the relation of FIG. 9, the angle conditions α1 to α3 for enhancing (increasing) the luminous intensity in the target observation angle direction can be obtained.

FIG. 10 is an example of setting the angle α1, the angle α2, and the angle α3 of the vehicle reflector 10 so as to satisfy the relation of $-α1=α2=α3=0.06°$ based on the above described knowledge in order to enhance the luminous intensity in the direction of the observation angle of 0.02° (see FIGS. 8 and 9). In FIG. 10, the first inclination angle, the second inclination angle, the third inclination angle, the downward direction rotational angle and the upward direction rotational angle are set at, 35.264°+angle α1, 35.264°+angle α2, 35.264°+angle α3, 120°, and 120°, respectively.

In FIG. 10, the first inclination angle, the second inclination angle, the third inclination angle, the downward direction rotational angle and the upward direction rotational angle of comparative example 1 are set at, 35.284°, 35.284°, 35.284°, 120.048°, and 120.048°, respectively.

In FIG. 10, the first inclination angle, the second inclination angle, the third inclination angle, the downward direction rotational angle and the upward direction rotational angle of comparative example 2 are set at, 35.293°, 35.293°, 35.293°, 120.0°, and 120.0°, respectively.

Referring to FIG. 10, it is found out that a fraction (a measured candle power of the vehicle reflector 10 of an example according to the subject matter)/(a measured candle power of comparative example 1) and a fraction (a measured candle power of the vehicle reflector 10 of an example according to the subject matter)/(a measured candle power of comparative example 2) are 100% or more at all the measurement points (test points), that is, when the observation angle is 0.2°, the condition of $-α1=α2=α3$ is satisfied, whereby the vehicle reflector 10 with efficiency higher than comparative examples 1 and 2 can be configured.

FIG. 11 is an example of setting the angle α1, the angle α2, and the angle α3 of the vehicle reflector 10 so as to satisfy the relation of $-α1=α2=α3=0.096°$ based on the above described knowledge in order to enhance the luminous intensity in the direction of the observation angle of 0.33° (see FIGS. 8 and 9). In FIG. 11, the first inclination angle, the second inclination angle, the third inclination angle, the downward direction rotational angle and the upward direction rotational angle are set at, 35.264°+angle α1, 35.264°+angle α2, 35.264°+angle α3, 120°, and 120°, respectively.

In FIG. 11, the first inclination angle, the second inclination angle, the third inclination angle, the downward direction rotational angle, and the upward direction rotational angle of comparative example 1 are set at, 35.296°, 35.296°, 35.296°, 120.078°, and 120.078°, respectively.

In FIG. 11, the first inclination angle, the second inclination angle, the third inclination angle, the downward direction rotational angle, and the upward direction rotational angle of comparative example 2 are set at, 35.312°, 35.312°, 35.312°, 120.0°, and 120.0°, respectively.

Referring to FIG. 11, it is found out that the fraction (a measured candle power of the vehicle reflector 10 of an example according to the subject matter)/(a measured candle power of comparative example 1) and that the fraction (a measured candle power of the vehicle reflector 10 of an example according to the subject matter)/(a measured candle power of comparative example 2) are about 100% or more at all the measurement points, that is, when the observation angle is 0.33°, the condition of $-α1=α2=α3$ is satisfied, whereby the vehicle reflector 10 with an efficiency equivalent to or higher than comparative examples 1 and 2 can be configured.

As described above, according to the vehicle reflector 10 of the present embodiment, the respective rotational angles of the downward direction surface 11b (corresponding to the second reflection surface) and the upward direction surface 11c (corresponding to the third reflection surface) with the reference axis AX as the center are set at 120°, and therefore, by only setting practically three parameters ($\alpha 1, \alpha 2, \alpha 3$) so as to satisfy the relation of $-\alpha 1=\alpha 2=\alpha 3$ (or $-\alpha 1\approx\alpha 2=\alpha 3$) without performing adjustment of the rotational angles $\beta$ and $\gamma$ of the downward direction surface 11b and the upward direction surface 11c, the luminous intensity in the direction of the observation angle (for example, 0.2°, 0.33°) can be enhanced to be equivalent to or higher than the conventional reflector (FIGS. 10 and 11). More specifically, according to the vehicle reflector 10 of the present embodiment, adjustment of the rotational angles $\beta$ and $\gamma$ of the downward direction surface 11b and the upward direction surface 11c, which has been undertaken in certain conventional cases, is not required, and therefore the number of adjustment items decreases, and manufacturing errors can be minimized, so that quality of the finished products can be maintained or increased.

More specifically, since the vehicle reflector 10 having an idealistic diffusion angle can be manufactured with only adjustment of the three angles $\alpha 1$ to $\alpha 3$, the reflector 10 can therefore, be produced with a similar manufacturing process as compared to the above-described conventional vehicle reflectors. Further, as compared with the conventional reflector for which five parameters are adjusted, the vehicle reflector 10 can be manufactured at low cost.

In the case of adaptation to the standard of a vehicle reflector (ECE0.33° (the standard based on the ECE (Economic Commission for Europe) Regulation), SAE0.2° (the standard provided by the Society of Automotive Engineers)), if the accuracy of finishing is 0.012° or less, an increase in the luminous intensity at about three times compared to the above-described conventional reflectors can be reliably realized (conventionally, accuracy of about ¹⁄₁₀₀₀° has been necessary).

Further, the luminous intensity reduction rate of H-20L/H-20R is lower than the above-described conventional reflector (60% reduction with respect to 70% reduction of the conventional reflector), and therefore, the SAE standard adaptability of the vehicle reflector can be met and enhanced.

With respect to actual performance of the vehicle reflector 10, if the diffusion angle is desired to be adjusted in the lateral direction, the diffusion angle can be adjusted by rotating the respective surfaces 11a to 11c around the reference axis AX1 with the angles $\alpha 1$ to $\alpha 3$ of the respective surfaces 11a to 11c exactly as they are. This means adaptation to the standard is performed by rotating the light collecting position while the three light rays Ray1 to Ray3 are in a superimposed state.

Thereby, the ray with a high luminous intensity can be reflected to an arbitrary standard position including positions in the vertical direction, but also positions in the lateral direction. Further, the required area of the vehicle reflector 10 can be reduced.

Next, an example of a reflex pin 20 for use in formation of the above described retroreflection element 11 will be described.

Figure 12:
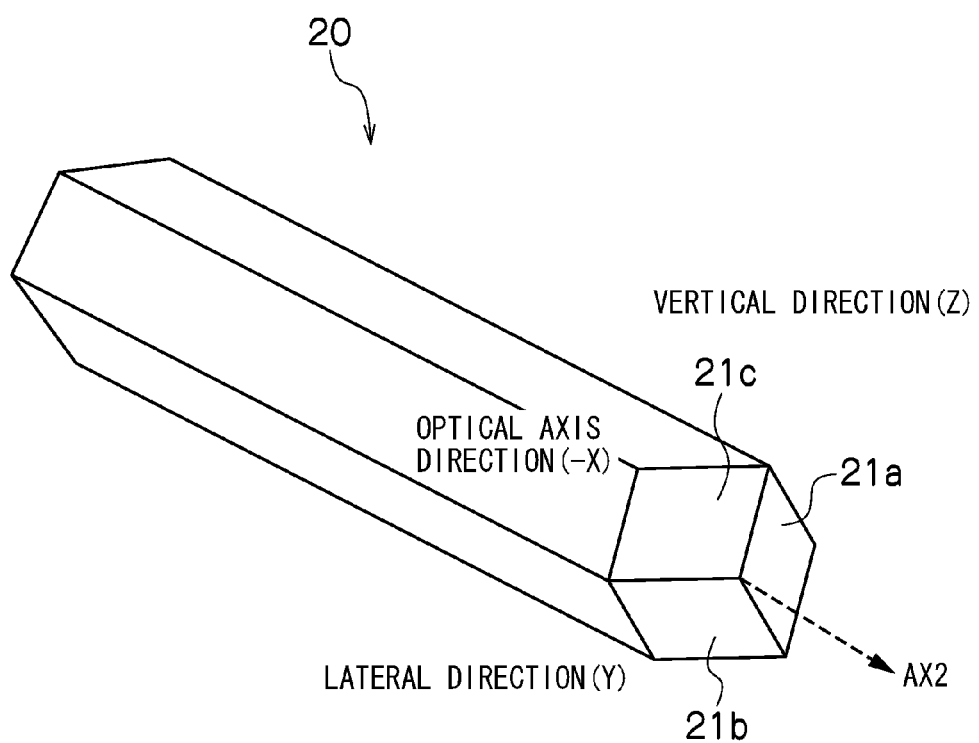
FIG. 12 is a perspective view of a reflex pin made in accordance with principles of the disclosed subject matter.
Figure 13:
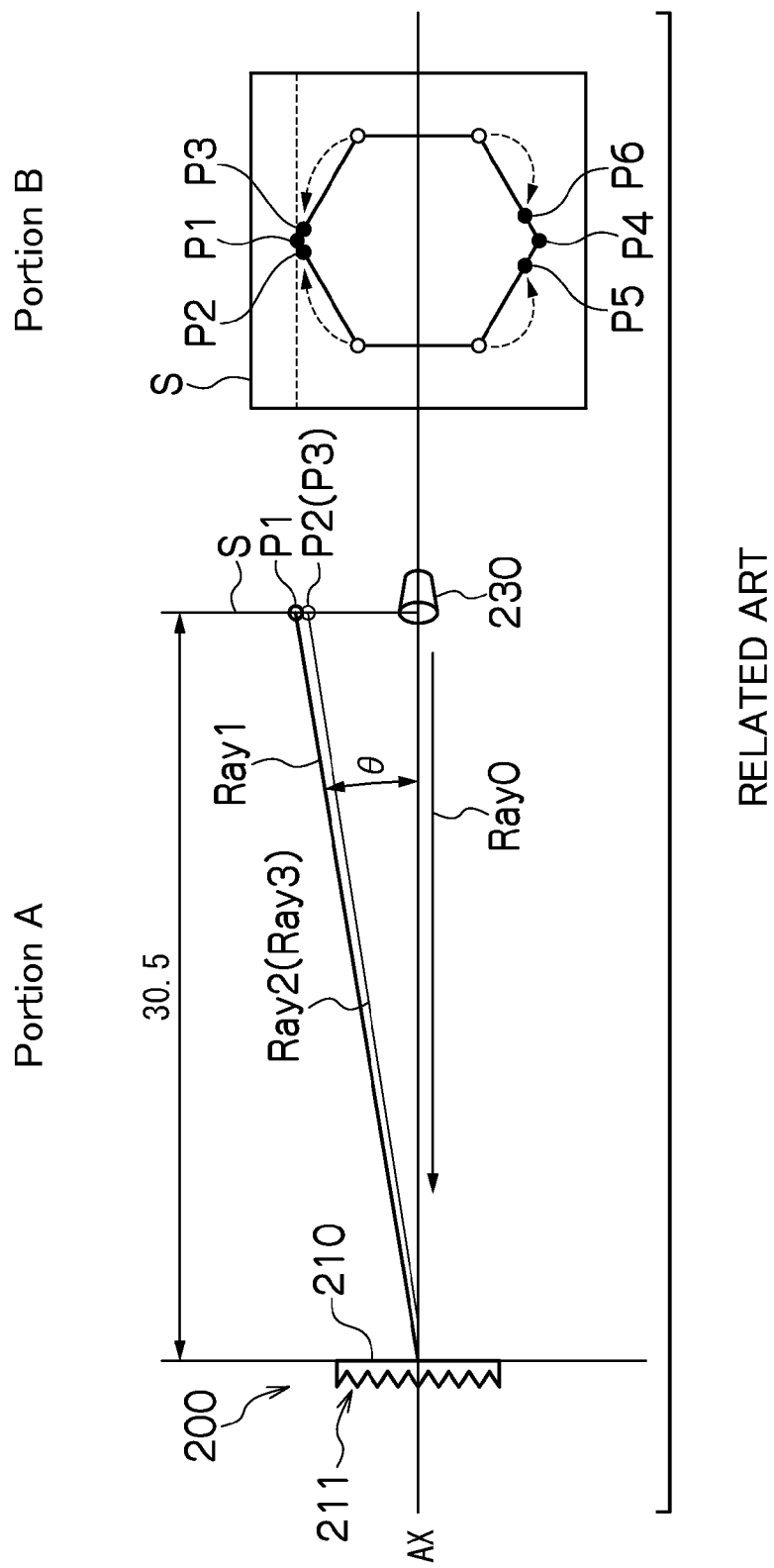
FIG. 13 is a diagram illustrating collection points at which reflection light rays reflected by a conventional vehicle reflector collect (Portion A of FIG. 13 is a diagram illustrating arrangement of a conventional vehicle reflector 210, a light source 230 and a vertical screen S, and Portion B of FIG. 13 is a diagram illustrating the points P1 to P3 at which the reflection light rays R1 to R3 collect respectively)
Figure 14:
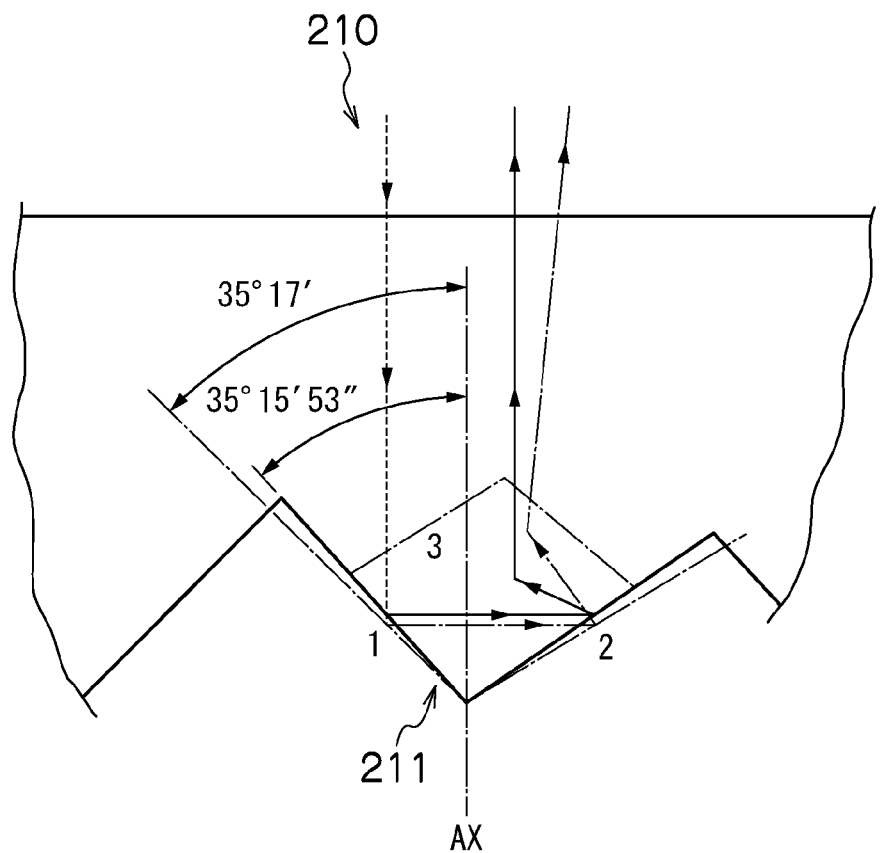
FIG. 14 is a view illustrating a configuration of a retroreflection element formed in the conventional vehicle reflector of FIG. 13.
Figure 15:
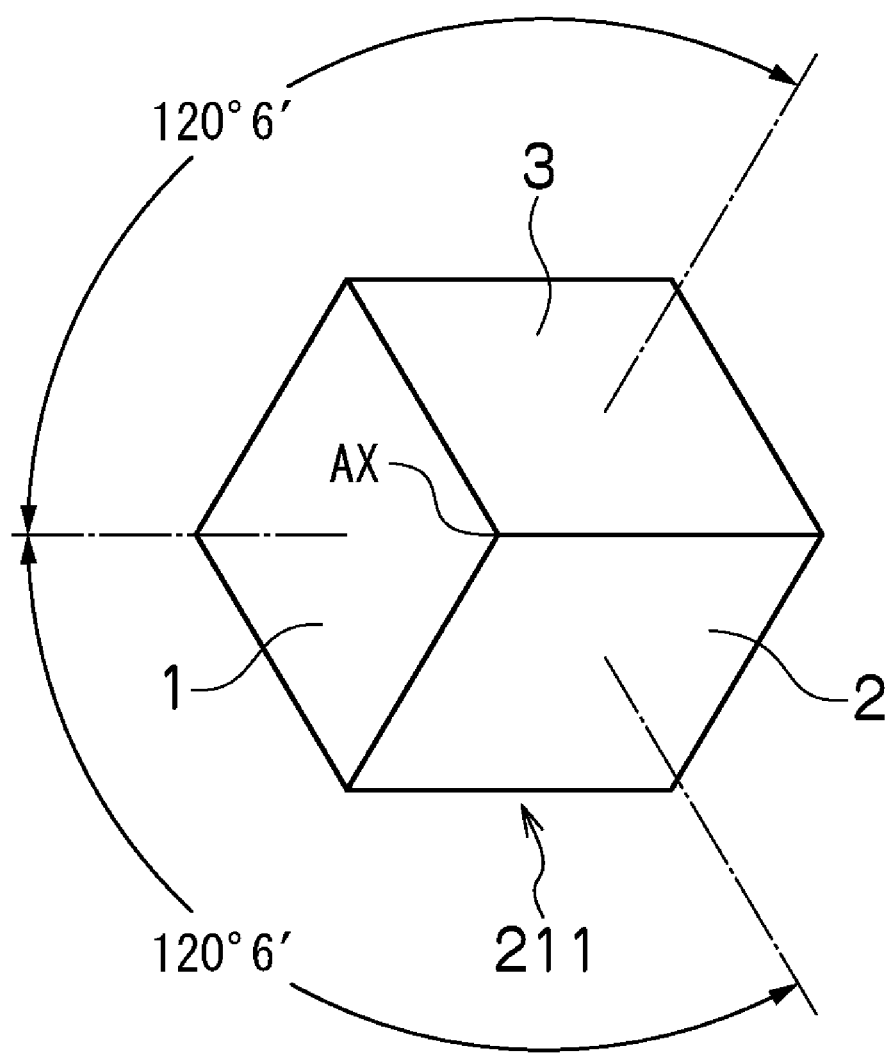
FIG. 15 is a view illustrating the configuration of the retroreflection element formed in the conventional vehicle reflector of FIG. 13.
Figure 16:
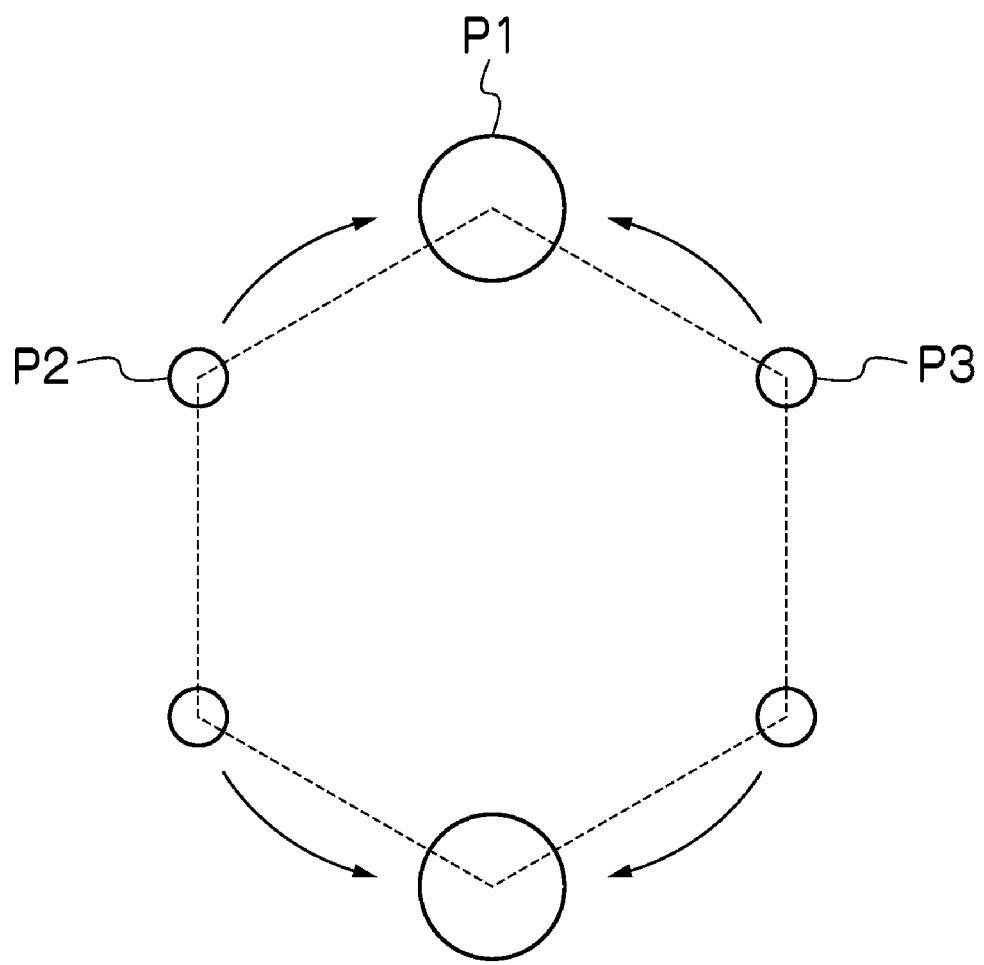
FIG. 16 is a view illustrating the point P1 to P3 at which reflection light rays advancing diagonally upward with respect to the reference axis AX collect according to the conventional vehicle reflector and retroreflection element of FIG. 13.

The reflex pin 20 can include a lateral direction surface 21a (corresponding to the first inclined surface of the exemplary reflector 10), a downward direction surface 21b (corresponding to the second inclined surface of the exemplary reflector 10) and an upward direction surface 21c (corresponding to the third inclined surface of the exemplary reflector 10) which are formed on a tip end portion 21 thereof, as illustrated in FIG. 12. The respective surfaces 21a to 21c are adjacently disposed to form a corner portion of a substantially regular hexahedron (also called a corner cube portion) (see FIG. 12).

As illustrated in FIG. 12, the lateral direction surface 21a can be inclined by a first inclination angle $\alpha 4$ with respect to a center/longitudinal axis AX2 extending in the longitudinal direction of the reflex pin 20. The downward direction surface 21b can be disposed at a position which is inclined by a second inclination angle $\alpha 5$ with respect to the center axis AX2, and rotated by a first rotational angle 120° with the center axis AX2 as the center from the reference surface (lateral direction surface 21a). The upward direction surface 21c can be disposed at a position which is inclined by a third inclination angle $\alpha 6$ with respect to the center axis AX2 and rotated by the second rotational angle 120° in the opposite direction from the downward direction surface 21b with the center axis AX2 as the center from the reference surface (lateral direction surface 21a). The respective angles $\alpha 4$ to $\alpha 6$ can be set to satisfy the relation of $-\alpha 4=\alpha 5=\alpha 6$ (or $-\alpha 4\approx\alpha 5=\alpha 6$) based on the above described knowledge.

FIG. 12 is an example of forming each of the surfaces 21a to 21c into a substantially square shape, and configuring the reflex pin 20 with a shape of a section perpendicular to the center axis AX2 being hexagonal. A plurality of reflex pins 20 can be combined as illustrated in FIG. 2, for example, and can be used for formation of the vehicle reflector 10 in which a plurality of retroreflection elements 11 are disposed as illustrated in FIG. 1. In a manufacturing process of the vehicle reflector 10, a plurality of reflex pins 20 can be combined as illustrated in FIG. 2, and the combined reflex pins 20 can be set in a mold for mold injection. Thereafter, the vehicle reflector 10 can be shaped by using the mold according to a known mold injection method. Alternatively, a plurality of reflex pins 20 can be combined as illustrated in FIG. 2, and a material on which a shape of a surface of the combined reflex pins (that is, a surface including reflection surfaces 21a, 21b and 21c) are transferred can be provided in a mold for mold injection. Thereafter, the vehicle reflector 10 can be shaped by using the mold.

As described above, according to the reflex pin 20 of the present embodiment, the respective rotational angles of the downward direction surface 21b (corresponding to the second inclined surface of the exemplary reflector 10) and the upward direction surface 21c (corresponding to the third inclined surface of exemplary reflector 10) with the center axis AX2 of the reflex pin as the center can be set at 120°. Therefore, a reflex pin can be formed, which is used in formation of the vehicle reflector 10 which can enhance the luminous intensity in the direction of the observation angle (for example, 0.2°, 0.33°) direction to be equivalent to or higher than the conventional reflector by only adjusting practically three parameters ($\alpha 4, \alpha 5, \alpha 6$) to satisfy the relation of $-\alpha 4=\alpha 5=\alpha 6$ (or $-\alpha 4\approx\alpha 5=\alpha 6$) without performing adjustment of the respective rotational angles $\beta$ and $\gamma$ of the downward direction surface 21b and the upward direction surface 21c, which has been conventionally undertaken. More specifically, according to the reflex pin 20 of the present embodiment, adjustment of the respective rotational angles $\beta$ and $\gamma$ of the downward direction surface 21b and the upward direction surface 21c is not required, although the adjustment of the respective rotational angles $\beta$ and $\gamma$ has been conventionally undertaken. Therefore, the number of adjustment items can decrease, and manufacturing errors can be restrained/prevented, so that quality of the finished products can be increased.

The above described embodiment is only illustration in all respects. It will be apparent to those skilled in the art that various modifications and variations can be made in the presently disclosed subject matter without departing from the spirit or scope of the presently disclosed subject matter. Thus, it is intended that the presently disclosed subject matter cover modifications and variations thereto provided they come within the scope of the appended claims and their equivalents. All related art references described above are hereby incorporated in their entirety by reference.

What is claimed is:

1. A vehicle reflector comprising:
    a plurality of retroreflection elements configured to retroreflect an incident light ray in an observation angle direction,
    wherein the plurality of retroreflection elements include a first reflection surface, a second reflection surface, and a third reflection surface which are adjacently disposed to form a corner portion of a substantially regular hexahedron,
    the first reflection surface is inclined by 35.264°+angle $\alpha 1$ with respect to a reference axis,
    the second reflection surface is inclined by 35.264°+angle $\alpha 2$ with respect to the reference axis and is disposed at a position rotated by 120° about the reference axis from the first reflection surface,
    the third reflection surface is inclined by 35.264°+angle $\alpha 3$ with respect to the reference axis and is disposed at a position rotated by 120° in an opposite direction from the second reflection surface about the reference axis from the first reflection surface, and
    the angle $\alpha 1$, angle $\alpha 2$, and angle $\alpha 3$ are set to satisfy a relation of $-\alpha 1 \approx \alpha 2 = \alpha 3$.

2. The vehicle reflector of claim 1, wherein the reflector consists of a transparent material.

3. The vehicle reflector of claim 1, wherein the reflector consists of a light transmissive material selected from the group consisting of acryl and polycarbonate.

4. The vehicle reflector of claim 1, wherein the angle $\alpha 1$, angle $\alpha 2$, and angle $\alpha 3$ are set to satisfy a relation of $-\alpha 1 = \alpha 2 = \alpha 3$.

5. The vehicle reflector of claim 1, wherein the reflector has an optical axis and the reference axis is parallel with the optical axis of the reflector.

6. A reflex pin comprising:
    a tip end portion configured to form each of a plurality of retroreflection elements, the tip end portion configured to form a surface for retroreflecting an incident light ray in an observation angle direction,
    wherein the tip end portion includes a first inclined surface, a second inclined surface, and a third inclined surface adjacently disposed to form a corner portion of a substantially regular hexahedron,
    the first inclined surface is inclined by 35.264°+angle $\alpha 4$ with respect to a longitudinal center axis of the reflex pin,
    the second inclined surface is inclined by 35.264°+angle $\alpha 5$ with respect to the longitudinal center axis of the reflex pin and is disposed at a position rotated by 120° about the longitudinal center axis of the reflex pin from the first inclined surface,
    the third inclined surface is inclined by 35.264°+angle $\alpha 6$ with respect to the longitudinal center axis of the reflex pin and is disposed at a position rotated by 120° in an opposite direction from the second inclined surface about the longitudinal center axis of the reflex pin from the first inclined surface, and
    the angle $\alpha 4$, angle $\alpha 5$, and angle $\alpha 6$ are set to satisfy a relation of $-\alpha 4 \approx \alpha 5 = \alpha 6$.

7. The reflex pin of claim 6, wherein the angle $\alpha 4$, angle $\alpha 5$, and angle $\alpha 6$ are set to satisfy a relation of $-\alpha 4 = \alpha 5 = \alpha 6$.

* * * * *